UNITED STATES PATENT OFFICE.

MYRTIL KAHN, OF ELBERFELD, GERMANY, ASSIGNOR TO THE FARBENFABRIKEN OF ELBERFELD COMPANY, OF NEW YORK, N. Y.

VIOLET AZO DYE.

SPECIFICATION forming part of Letters Patent No. 603,008, dated April 26, 1898.

Application filed November 19, 1897. Serial No. 659,193. (Specimens.)

*To all whom it may concern:*

Be it known that I, MYRTIL KAHN, doctor of philosophy and chemist, (assignor to the FARBENFABRIKEN OF ELBERFELD COMPANY, of New York,) residing at Elberfeld, Germany, have invented a new and useful Improvement in the Manufacture of Violet Azo Dye; and I hereby declare the following to be a clear and exact description of my invention.

My invention relates to the production of a new violet dyestuff by combining in an acid solution one molecule of a tetrazodiphenyl salt with two molecules of 1.8 amidonaphthol and 4 monosulfo-acid.

In carrying out my new process practically I can proceed as follows: 52.2 kilos, by weight, of the sodium salt of 1.8 amidonaphthol and 4 monosulfo-acid are dissolved in fifteen hundred liters of water, and from the resulting solution after previous cooling the free amidonaphtholsulfo-acid is precipitated in a finely-divided state by the addition of hydrochloric acid. Into the liquid thus obtained a solution of tetrazodiphenylchlorid, which has been prepared by diazotizing 18.4 kilos, by weight, of benzidin, is poured with stirring, and subsequently as much of a sodium-acetate solution is added as is necessary to avoid the presence of mineral acid during the reaction. The mixture is then stirred for about one day. Finally it is heated to about 60° centigrade, neutralized by means of sodium carbonate, and a suitable quantity of common salt is added in order to complete the separation of the new dyestuff, which is filtered, pressed, and dried.

The new dyestuff is the sodium salt of an acid having the formula:

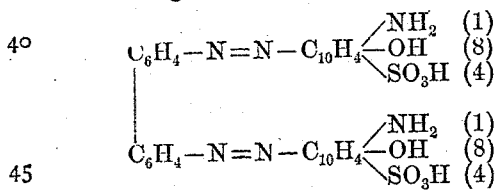

and represents a black powder with a bronze-like luster. It dissolves in water with a violet color. By concentrated sulfuric acid (66° Baumé) it is dissolved with a blue color. On adding a sufficient quantity of ice to the sulfuric-acid solution a blue flaky precipitate is obtained.

The new coloring-matter dyes unmordanted cotton violet shades, which when treated with solutions of diazotized paranitranilin and of sodium acetate change into black shades which are fast to acids and against washing.

Having now described my invention and in what manner the same is to be performed, what I claim as new, and desire to secure by Letters Patent, is—

1. The process for producing a new coloring-matter by combining in an acid solution one molecule of a tetrazodiphenyl salt and two molecules of 1.8 amidonaphthol and 4 monosulfo-acid substantially as described.

2. As a new article of manufacture the new dyestuff being an alkaline salt of an acid of the formula:

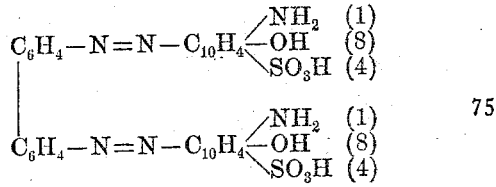

and which is a black powder of a bronze-like luster soluble in water with a violet color and in concentrated sulfuric acid yielding a blue solution from which a blue flaky precipitate is obtained on the addition of a sufficient quantity of ice, dyeing unmordanted cotton violet shades which when treated with solutions of diazotized paranitranilin and sodium acetate change into black shades fast to acids and to washing substantially as described.

In testimony whereof I have signed my name in the presence of two subscribing witnesses.

MYRTIL KAHN.

Witnesses:
R. E. JAHN,
OTTO KÖNIG.

Corrections in Letters Patent No. 603,008.

It is hereby certified that in Letters Patent No. 603,008, granted April 26, 1898, upon the application of Myrtil Kahn, of Elberfeld, Germany, for an improvement in "Violet Azo Dyes," errors appear in the printed specification requiring correction, as follows: In lines 14, 18, and 66, the word "and" should be stricken out; and that the said Letters Patent should be read with these corrections therein that the same may conform to the record of the case in the Patent Office.

Signed, countersigned, and sealed this 10th day of May, A. D., 1898.

[SEAL.]

WEBSTER DAVIS,
*Assistant Secretary of the Interior.*

Countersigned:
C. H. DUELL,
*Commissioner of Patents.*